United States Patent [19]

McCurry

[11] 4,391,716
[45] Jul. 5, 1983

[54] PREFERENTIAL WICKING SYSTEM

[75] Inventor: H. Michael McCurry, Richmond, Va.

[73] Assignee: American Filtrona Corporation, Richmond, Va.

[21] Appl. No.: 333,300

[22] Filed: Dec. 22, 1981

[51] Int. Cl.³ .......................................... B01D 17/02
[52] U.S. Cl. .................................. 210/799; 210/801; 210/116; 210/172; 210/309; 210/416.4
[58] Field of Search ............................ 210/799–801, 210/109, 114, 116, 172, 303, 308, 309, 416 A; 261/99, 104, 107

[56] References Cited

U.S. PATENT DOCUMENTS

| | | | |
|---|---|---|---|
| 1,174,549 | 3/1916 | Cully | 210/513 X |
| 1,983,295 | 12/1934 | Kohler | 261/104 |
| 2,790,560 | 4/1957 | Beyland | 210/296 |
| 3,309,843 | 3/1967 | Rigopulos et al. | 55/35 |
| 3,380,914 | 4/1968 | Vranian | 210/172 X |
| 3,417,013 | 12/1968 | Roberts | 210/508 X |
| 3,483,988 | 12/1969 | Hazzard | 210/416.4 X |
| 3,496,996 | 2/1970 | Osdor | 165/111 |
| 3,508,658 | 4/1970 | McVay | 210/123 X |
| 4,257,890 | 3/1981 | Hurner | 210/112 |

FOREIGN PATENT DOCUMENTS 882689 6/1943 France .................. 210/114

*Primary Examiner*—Robert H. Spitzer
*Attorney, Agent, or Firm*—Holman & Stern

[57] ABSTRACT

Removal of a first liquid, such as water, from a tank containing a second liquid of lower specific gravity, such as diesel fuel, is achieved with a liquid trap chamber into which the first liquid is delivered by a primer wick and from which the first liquid is withdrawn by an exhaust wick or pump. The primer wick transversely fills an in-flow passage above a downward-facing inlet opening of that passage. The first liquid is drawn from the tank by the primer wick, which spills that liquid over a weir into the liquid trap chamber. The bottom of the liquid trap chamber is disposed at a level below said inlet opening. The exhaust wick is disposed to transversely fill an outlet passage disposed above the liquid trap chamber with the bottom of the exhaust wick or pump sensor positioned at least as high as the top of the primer wick. When the first liquid in the tank falls below an established level, the primer wick stops pumping and liquid from the liquid trap chamber falls below the bottom of the exhaust wick or pump sensor to prevent further removal of liquid therefrom. The first liquid remaining in the liquid trap chamber forms a dam which blocks flow communication from the primer wick to the exhaust wick or pump sensor. Any of the second fluid which may enter the liquid trap chamber collects on top of the dam at the primer wick side.

24 Claims, 6 Drawing Figures

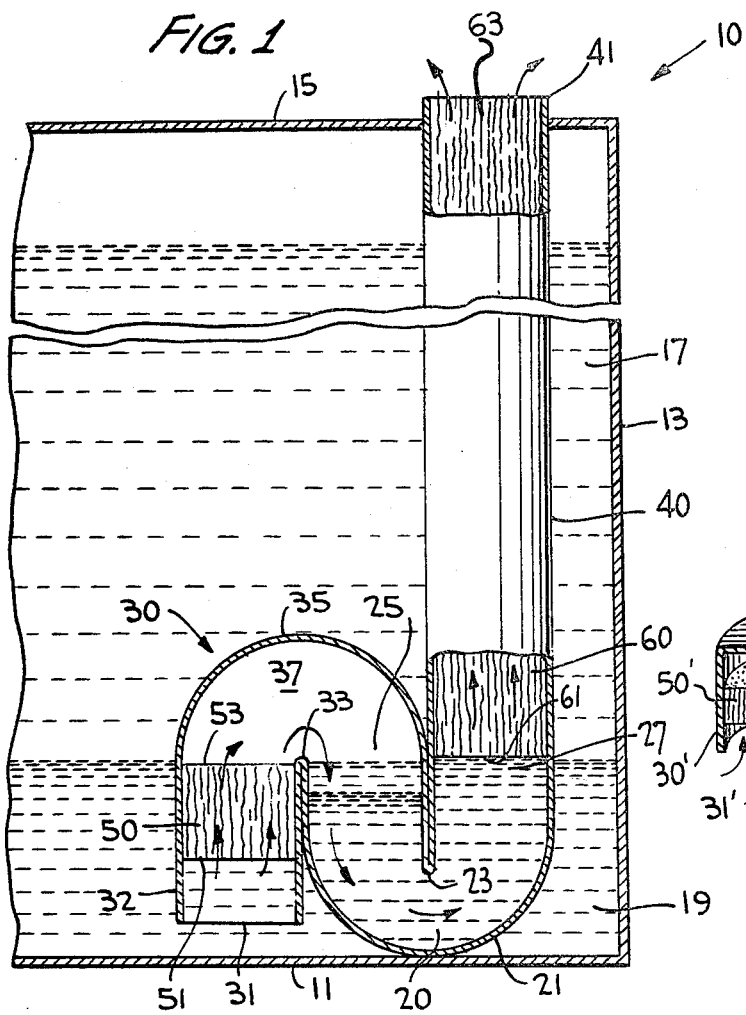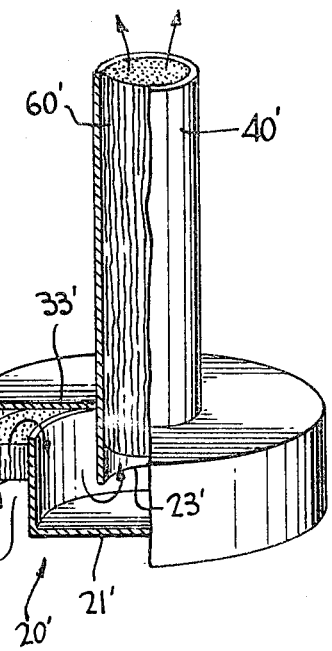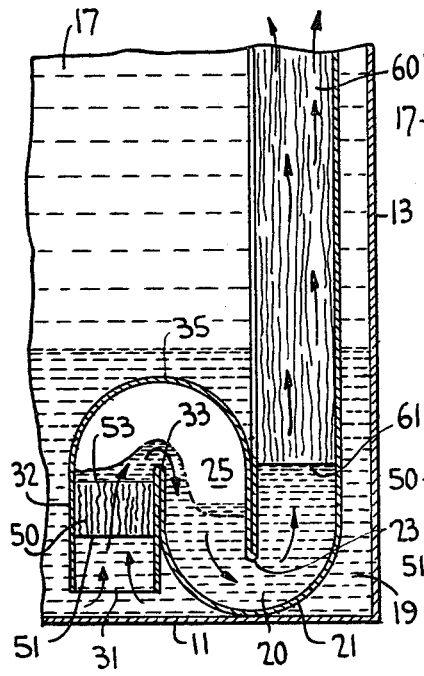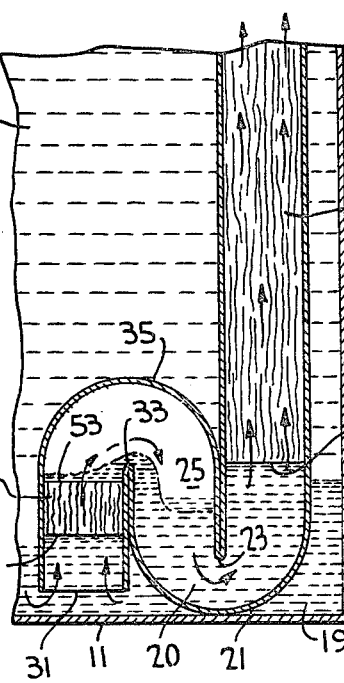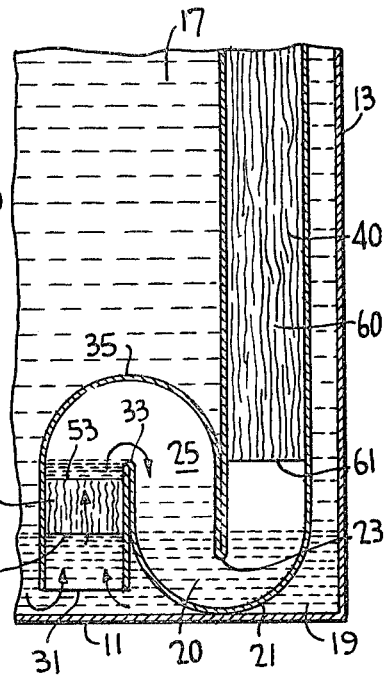

PREFERENTIAL WICKING SYSTEM

TECHNICAL FIELD

The present invention relates to an improved method and apparatus for separating a first fluid from a second fluid of lesser specific gravity. More specifically, the present invention relates to an improved method and apparatus for removing water from the bottom of a tank of diesel fuel.

BACKGROUND OF THE INVENTION

The presence of water in diesel fuel tanks is a problem for both automobile fuel tanks and fuel storage tanks. In both cases, significant levels of water settle at the bottom of the tank, supporting the less dense immiscible fuel thereabove by means of surface tension at the fuel-water interface. It is necessary to remove the water from the tank for many reasons. For example, the water, if permitted to collect, limits the useful capacity of the tank. In addition, in colder climates, the water tends to freeze. Further, the presence of water in the fuel will often cause the fuel filter to become clogged and the engine to stall. Any water passing through the filters can cause damage to the fuel injection system.

Several prior art devices have been proposed for removing water from fuel tanks. These have, for the most part, been found unsatisfactory for one reason or another. Many such devices require periodic maintenance by a vehicle driver at intervals which are more frequent that would normally be the case for such vehicles. Other devices require frequent emptying of a water collection tank into which the separated water is passed. Still other prior art devices, although operating automatically to discharge collected water, can only be used in conjunction with air brakes such as those employed on heavy commercial vehicles.

All prior art devices utilize filtrates to effect the separation of water from fuel while this device utilizes wicking or capillary activity to remove water deposits before these deposits leave the storage vessel.

With the increasing popularity of diesel engines for automobiles, there is a definite need for a convenient, simple, efficient and inexpensive approach to separating water from diesel fuel.

SUMMARY OF THE INVENTION

Although the present invention is described in terms of separating water from diesel fuel, it should be noted that it is applicable to separating one liquid from another where the separated liquid has a higher specific gravity and is immiscible with the other liquid so that the separated liquid collects at the bottom of the tank and supports the other liquid by surface tension. Further, although the separation of water and diesel fuel in accordance with the present invention is particularly advantageous for use in an automobile fuel tank, it should be noted that the invention is useful in conjunction with any storage tank or process tank for diesel fuel or other liquids.

It is therefore an object of the present invention to provide an improved method and apparatus for efficiently and simply separating a first liquid from a second liquid having a lower specific gravity.

It is another object of the present invention to provide an improved method and apparatus for separating water from diesel fuel.

It is still another object of the present invention to provide an improved method and apparatus for separating water from diesel fuel without requiring periodic emptying of a water collection tank and without requiring periodic maintenance of the water separation mechanism.

In accordance with the present invention, a water trap chamber is fed from near the bottom of a diesel storage tank by a primer wick and has water withdrawn therefrom automatically by an exhaust wick or an exhaust pump. The primer wick is disposed in an inlet passage to transversely fill that passage at a location above an inlet opening spaced slightly above the storage tank bottom. Water drawn to the top of the primer wick is spilled over a weir into the water trap chamber which has a top wall which separates the weir side from an upwardly-extending outlet passage transversely filled by the exhaust wick or, alternatively, in which the exhaust pump level sensor is located. The bottom of the water trap chamber is at a lower level than the inlet opening of the inlet passage. As long as a sufficient water level is present in the outlet passage to contact the bottom of the exhaust wick or exhaust pump sensor, the exhaust wick or exhaust pump draws water therefrom up the outlet passage. The outlet passage may be exhausted to atmosphere or directed to a water collection chamber. When the level of water in the storage tank falls to a level where it can no longer be drawn up and over the weir by the primer wick, the water in the liquid trap chamber eventually falls below the bottom of the exhaust wick or the exhaust pump sensor. However, this water level in the liquid trap chamber subsists on both sides of the top wall to serve as a dam which blocks flow communication to the outlet passage. Any diesel fuel which may be present on the weir side of the liquid trap chamber is prevented from passing through the water dam because of the surface tension existing at the liquid interface due to the different specific gravities of the liquids. If the water level in the storage tank increases, the primer wick once again operates to "pump" water into the liquid trap chamber and the water is withdrawn therefrom by the exhaust wick or pump while the diesel fuel remains, for the most part, blocked on top of the water dam. Any small amount of diesel fuel which may pass through the exhaust wick or pump, unlike gasoline, can be wicked directly to atmosphere because it is not as volatile and does not have the same rigid emission control requirements as gasoline.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings as described below, wherein:

FIG. 1 is a side elevation view, in partial section, of a preferred embodiment of the present invention, illustrating a water separation mechanism employed in a diesel fuel tank;

FIGS. 2, 3, and 4 are views similar to FIG. 1 and illustrate, diagrammatically, respective successive stages in the process of removing water from the storage tank;

FIG. 5 is a view in perspective of another liquid separator mechanism in accordance with the present invention.

DESCRIPTION OF THE PREFERRED EMBODIMENTS

Figure 6:
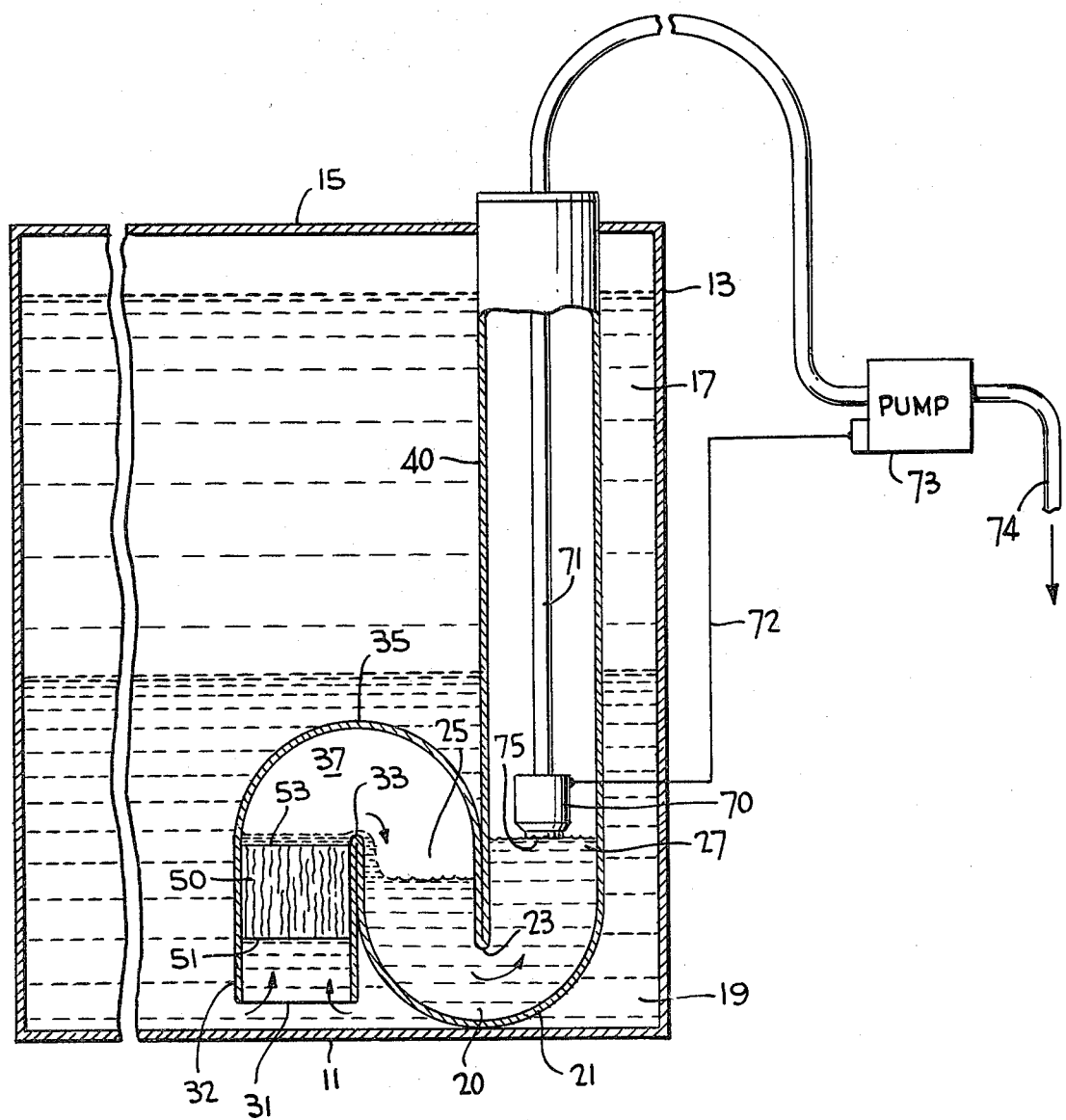
FIG. 6 is a side elevation view, partially schematic and in partial section, of an alternative embodiment of the present invention.

Referring specifically to FIG. 1 of the accompanying drawings, an enclosed tank 10 for diesel fuel includes a bottom wall 11, side walls 13 (only one of which is illustrated in FIG. 1), and a top wall 15. Diesel fuel 17 is illustrated in the tank by dashed lines which are relatively widely spaced. Water 19 is illustrated in the tank by dashed lines which are relatively closely spaced. Since water has a higher specific gravity than diesel fuel, the diesel fuel is supported on the surface of the water 19 by means of surface tension existing at the interface between the two liquids.

The apparatus for removing water from tank 10 includes a water trap chamber 20 having a bottom wall 21, a top wall 23, an upwardly-facing inlet opening 25, and an upwardly-facing outlet opening 27. In the particular embodiment illustrated in FIG. 1, bottom wall 21 of the water trap chamber 20 is generally U-shaped so that the chamber 20 takes the general form of an elbow bend. Top wall 23 takes the form of a narrow edge formed as the terminus of the two adjacent downwardly-projecting side walls of inlet opening 25 and outlet opening 27. An inlet passage 30 for the apparatus includes a substantially vertically-extending section 32 with a downwardly-facing ingress opening 31. The ingress opening 31 is spaced a slight distance above the bottom wall 11 of the tank at a level higher than the bottom wall 21 of chamber 20. Vertically-extending section 32 terminates in one leg of a generally U-shaped section 35, the other leg of which terminates in inlet opening 25 of the water trap chamber 20. The adjacent sides of vertically-extending passage section 32 and inlet opening 25 form a weir edge 33 over which fluid, reaching the level of the weir 33, flows to enter chamber 20 via inlet opening 25. As will be described in detail below, an air bubble is trapped in region 37 above the weir 33.

An outlet passage 40 extends generally upward from the outlet opening 27 of chamber 20, through the fluid in the tank and through a suitably provided aperture in top wall 15 of tank 10. The upper end of outlet passage 40 is shown open to ambient; however, it should be noted that outlet passage 40 can be extended to direct flow therefrom into a container, if desired.

A primer wick 50 is packed into section 32 of passage 30 to frictionally or otherwise engage and transversely fill a portion of that section. Primer wick 50 includes a bottom end 51 and a top end 53. Importantly, the bottom end 51 of primer wick 50 is disposed somewhat above the ingress opening 31 of passage 30 and, preferably, at a level above the lowermost portion of the top wall 23 in chamber 20. The top end 53 of primer wick 50 is preferably disposed at a level just slightly below weir 33. With such a configuration, the wick 50 is, of necessity, somewhat shorter than the length of the vertically-extending section 32 of inlet passage 30.

An exhaust wick 60 is similarly packed into outlet passage 40 to frictionally engage and transversely fill a portion of that passage. Exhaust wick 60 has a lower end 61 and an upper end 63. The lower end 61 of exhaust wick 60 is preferably disposed at a level no lower than the top end 53 of primer wick 50; that is, the lower end 61 of the exhaust wick can be at the same level or higher than the top end 53 of the primer wick. In any case, it will be appreciated that the lower end 61 of the exhaust wick is disposed considerably above the lowermost portion of top wall 23 in chamber 20. The upper end 63 of exhaust wick 60 is shown in FIG. 1 as terminating at the open end 41 of outlet passage 40. It will be appreciated that the exhaust wick can extend beyond the open end 41 or, in more unusual cases, terminate below open end 41.

The material utilized for primer wick 50 and exhaust wick 60 is not critical as long as it "wicks" the intended fluid. In other words, the primer and exhaust wicks can be any conventional material which draws water upward therethrough by capillary action in a well-known manner. In the preferred embodiment, the wicks are made from multiple longitudinally-extending cellulose acetate fibers which are crimped and radially compressed with a suitable circumferential wrap material such as Mylar, cellophane, etc. Importantly, no bonding agent is used in manufacture of the primer wick to adhere the fibers to one another because the bonding agent tends to migrate to the top of the wick where it remains to block further "wicking" action of the intended fluid.

The operation of the apparatus, as observed during numerous experimental tests, is quite unexpected and, in face, is difficult to explain. When the apparatus is placed in tank 10 with the bottom wall 21 of chamber 20 resting on the bottom wall 11 of the tank, the water 19 is drawn up through inlet passage 30 by the primer wick 50. Water reaching the top end 53 of primer wick 50 accumulates until it reaches a level above weir 33 at which time it spills over through inlet opening 25 into the water trap chamber 20. The water flows through chamber 20, up through outlet opening 27 into contact with the lower end 61 of exhaust wick 60. The exhaust wick draws the water in contact therewith up through outlet passage 40 to the open end 41 of that passage where it is evaporated into the ambient environment. As illustrated in FIGS. 3 and 4, this "pumping" action by the primer wick 50 continues until the level of water 19 in tank 10 falls below a predetermined level at which point the water in water trap chamber 20 is no longer at a high enough level to contact the lower end 61 of exhaust wick 60. This condition, as illustrated in FIG. 4, terminates the withdrawal of water from chamber 20 by the exhaust wick. However, the water in chamber 20 remains at a level above the lowermost portion of top wall 23 so that the remaining water forms a water dam which isolates exhaust wick 60 from inlet opening 25 and primer wick 50. It is this dam which serves to block passage of diesel fuel (which may have inadvertently been passed by primer wick 50) from passing through to the exhaust wick 60. Specifically, the diesel fuel, of lower specific gravity, resides in a column above the water in chamber 20 at the inlet side of the dam. Small amounts of such blocked diesel fuel 17 may be seen in FIGS. 1-4 at the inlet side of the dam.

In testing the apparatus, I observed that the "wicking" action tended to stop when the level of water 19 in tank 10 reached approximately or slightly above the level of the bottom end 51 of primer wick 50. Under such conditions, the "pumping" action of the primer wick terminated and contact between the water in water trap chamber 20 and the lower end 61 of exhaust wick 60 was broken.

I have tested the apparatus without a primer wick and found that water does not enter the ingress opening 31 of passage 30, other than minimal amounts of liquid that may enter that opening due to splashing when the tank 10 is filled. I have theorized, therefore, that exhaust 60 establishes a sufficient flow restriction in outlet passage 40 to preclude air from readily escaping through that passage to permit water to fill passage 30 and chamber 20 under normal circumstances. The presence of the primer wick 50 serves to pump the water through passage 30 and into chamber 20 so that it may be brought into contact with the lower end 61 of the exhaust wick and removed from the tank.

I have found that the bottom end 51 of primer wick 50 must be disposed above the ingress opening 31 of inlet passage 30 in order to prevent fuel from being "pumped" by the primer wick when water is totally removed from tank 10. I have also found that the lower end 61 of exhaust wick 60 must be no lower than the upper end 53 of the primer wick in order that the water dam which remains after contact is broken with the lower end 61 remain at a level above the lowermost portion of wall 23 to isolate exhaust wick 61 from inlet opening 25.

The embodiment illustrated in FIGS. 1–4 is in the form of a bent tube wherein the outlet passage 40 is an elongated vertical section of that tube contacting one end of a generally S-shaped section which comprises the water trap chamber 20 and inlet passage 30. Such a configuration is by no means critical, it being understood that the important features of the invention reside in the fact that the liquid trap chamber 20 has upwardly-facing inlet and outlet openings 25 and 27 which lead to inlet passage 30 and outlet passage 40, respectively. Further, inlet passage 30 must contain a primer wick 50 which is raised above the inlet opening 31 which in turn is raised above the bottom of chamber 20. Outlet passage 40 must contain an exhaust wick 60, the lower end 61 of which must be no higher than the top end 53 of the primer wick. The primer wick in turn must be at a level above the lowermost portion of the top wall 23 of chamber 20 which separates the inlet and outlet openings 25 and 27, respectively. In addition, the presence of the water dam in chamber 20 after the pumping action ceases, serves to prevent fluid from passing from the primer wick to the exhaust wick.

An example of another type of configuration for the apparatus of the present invention is illustrated in FIG. 5, wherein elements performing a similar function to those performed in the embodiment of FIG. 1 bear like reference numerals designed with a prime. A water trap chamber 20' is in the form of an open-top cylinder with a bottom wall 21'. Inlet passage 30 takes the form of an annular passage which surrounds chamber 20 and is defined in part by the peripheral wall of that chamber. The peripheral wall of chamber 20' terminates at a free edge which constitutes the weir 33'. Primer wick 50' is in the form of an annulus which is frictionally engaged in inlet passage 30' with its bottom end spaced above the inlet opening 31' of passage 30'. Outlet passage 40' is a tube supported above bottom wall 21' at a level below weir 33' so that the annular bottom edge of passage 40' serves as the lowermost portion 23' of the top wall of chamber 20'. The exhaust wick 60' in passage 40' has its lower end disposed substantially even with or slightly above the top of primer wick 50'.

Configurations other than those illustrated in FIGS. 1–5 are, of course, possible. For example, the top wall 23 of chamber 20 need not be an edge but may be a surface of any general configuration having a lowermost portion which is preferably disposed below, but no higher than, the bottom end 51 of primer wick 50. Chamber 20 may be a flat or otherwise configured chamber but must have its bottom wall disposed at a level lower than the ingress opening 31 of inlet passage 30. Section 35 of inlet passage 30 need not be U-shaped but can take any configuration consistent with the operation described herein. It should further be noted that when the term "vertically-extending" is utilized to describe section 32 of inlet passage 30 and outlet passage 40, these passages need not extend only vertically. In other words, the extension of these passages may have a vertical component, but there may be an oblique orientation for the passages. Further, the end 41 of outlet passage 40 may bend downwards after termination of the exhaust wick 60 so as to directed water passed by exhaust wick 60 downward to a container.

Another variation of the present embodiment eliminates the exhaust wick in favor of an exhaust pump. An embodiment of this type is illustrated in FIG. 6 wherein various elements bear the same reference numerals used for those elements in FIG. 1. The exhaust wick 60 has been replaced with sensor 70 having a sensing surface 75 disposed at the same level specified above for the bottom surface 61 of exhaust wick 60. Sensor 70 may be any conventional contact sensor which provides an electrically discernible indication, such as a contact closure or opening. This indication is transmitted by electrical cable 72, up through tube 40, to a pump 73 disposed outside tank 13. The pump has a fluid inlet end connected to a flow inlet conduit 71 which extends down into tube 71 to sensor 70. Pump 73 has a fluid outlet connected to an outlet conduit which delivers pumped fluid to a reservoir or disposal facility. When the bottom surface 75 of sensor 70 senses liquid level, pump 73 is actuated through cable 72 to draw liquid at that level up through inlet conduit 71 and out through outlet conduit 74.

The pump arrangement in FIG. 6 is capable of withdrawing liquid at a faster rate than is exhaust wick 60; therefore, the pump arrangement would be used in place of the exhaust wick where a rapid removal of liquid or removal . . . of large volumes of liquid . . . is necessary. The pump arrangement would also be used in place of the exhaust wick for applications where the removed liquid must be exhausted over relatively large distances.

It is to be understood that means for supporting the sensor 70 in tube 40 would be provided, as necessary, but are omitted from FIG. 6 to preserve clarity.

As noted above, the present invention does not only apply to separating water from diesel fuel; it also applies to separating a first liquid from a second liquid having a lower specific gravity. It should be noted that the invention described hereinabove can made to retrofit any storage vessel or tank used to contain, store, or transport fuels, oils, or other liquids having a specific gravity lower than water. Another advantage of the present invention, as described above, is that it permits release of undesirable water deposits into the atmosphere while preventing escape of fuel emissions as well as preventing fuel loss due to evaporation.

Another interesting advantage of the present invention relates to the fact that the upward flow through the primer wick 50 and exhaust wick 60 prevent clogging of the wicking material by trace solid contaminants, thereby giving the wicking material an indefinite useful life.

The rate of withdrawal of water from the tank depends on the density and size of the wicks. More specifically, water will be withdrawn from the tank at a faster rate if the wicks have larger cross-sectional areas and their fibers are more densely packed.

For establishing initial operation of the device, it is desirable that an amount of water be added to the apparatus to establish the dam in water trap 20 so as to preclude passage of fuel to the exhaust wick 60 or pump sensor 70. In this regard, the spacing of ingress opening 31 from the bottom 11 of tank 10 serves to leave a minimal amount of water within the tank at all times and thereby prevent fuel from entering ingress opening 31 and contacting the bottom end 51 of the primer wick.

In an embodiment actually tested and found operational, the following parameters were employed: the entire tubular apparatus, from upper end 41 of exhaust passage 40 to ingress opening 31 of inlet passage 30 had an inside diameter of ½ inch; the height of curved section 35 of the inlet passage above ingress opening 31 was 2.15 inches; the spacing between the bottom end 51 of primer wick 50 and the ingress opening 31 was 0.9 inches; the vertical spacing between the top of weir 33 and the lowermost portion of wall 23 was 1.3 inches; the spacing of the top of curved section 35 of inlet passage 30 above the bottom wall 21 of chamber 30 was 2.3 inches; the spacing between the upper end 41 of outlet passage 40 and the bottom wall 21 of chamber 20 was 8 inches; each of the primer wick 50 and exhaust wick 60 had a diameter of ½ inch; the length of the primer wick was ½ inch; and the length of the exhaust wick was 14 inches, thereby extending the exhaust wick beyond the upper end 41 of outlet passage 40. In the tests, 200 milliliters of water and 200 milliliters of diesel fuel, mixed together in a beaker, were poured into the tank 10 and the results illustrated in FIGS. 2, 3, and 4, and described hereinabove, ensued.

It is apparent that the invention may be embodied in other forms and constructions within the scope of the claims and I wish it to be understood that the particular forms illustrated and described herein are but a few of the possible embodiments falling within the scope of the invention, and that since various modifications and changes are possible, the present invention should not be limited to the specific embodiments disclosed.

I claim:

1. Apparatus for use in an upright position in separating a first liquid having a first specific gravity from a second liquid having a second specific gravity less than said first specific gravity, said apparatus comprising:
    a liquid trap chamber having a liquid-containing portion including a bottom chamber wall, an upwardly-directed inlet opening disposed above said liquid-containing portion, an upwardly-directed outlet opening disposed above said liquid-containing portion, and a top wall with a lowermost section separating said inlet and outlet openings;
    an inlet passage having a liquid ingress opening disposed at a level above said bottom wall and below said lowermost section of said top wall, said inlet passage further including weir means disposed at a level above said top and positioned to spill liquid above a predetermined level in said inlet passage into the inlet opening of said chamber;
    an outlet passage extending generally upward from said outlet opening of said chamber;
    primer wick means, having top and bottom ends disposed to transversely fill a portion of said inlet passage, for drawing liquid upward through said inlet passage from said ingress opening, wherein the bottom end of said primer wick means is disposed at a level spaced above said ingress opening; and
    exhaust means disposed at a further level in said outlet passage for drawing liquid at or above said further level upward through said outlet passage, wherein said further level is at least as high as the top end of said primer wick.

2. The apparatus according to claim 1, wherein said exhaust means is an exhaust wick disposed to transversely fill at least a portion of said outlet passage and having a lower end disposed at said further level.

3. The apparatus according to claim 1, wherein said exhaust means comprises pumping means including a liquid sensor means disposed at said further level and pump means responsive to said level sensor for pumping liquid from said further level out of said outlet passage.

4. The apparatus according to claims 1, 2 or 3, further comprising:
    a pool of said first liquid disposed in said liquid trap chamber to a level at least as high as said lowermost section of said top wall to isolate said inlet and outlet openings from one another.

5. The apparatus according to claim 1, wherein said outlet passage is a first relatively long vertically-extending tube having an open outlet end remote from said liquid trap member, wherein said inlet passage comprises a second relatively short vertically-extending tube.

6. The apparatus according to claim 5, wherein said inlet passage and said liquid trap chamber are formed as an S-shaped tube having one end in flow communication with said ingress opening and a second end in flow communication with said outlet passage.

7. The apparatus according to claims 1 or 2, wherein said primer wick means and said exhaust means are made from a capillary fibermass material comprising fibers extending longitudinally in the direction of flow through said primer and exhaust means, said fibers being crimped and peripherally wrapped with material which is impervious to said first and second liquids.

8. The apparatus according to claim 7, wherein said fibers are cellulose acetate fibers.

9. The apparatus according to claims 1 or 2, wherein said inlet passage is disposed peripherally about said liquid trap chamber.

10. The apparatus according to claim 9, wherein said liquid trap chamber is generally cylindrical and said inlet passage forms an annulus disposed partially about said liquid trap chamber, and wherein said lowermost section of said top chamber wall is at a level below said bottom end of said primer wick means.

11. The apparatus according to claim 10, wherein said ingress opening of said inlet passage is a downwardly facing annular opening.

12. The apparatus according to claims 1, 2 or 3, further comprising a tank, having a bottom wall and a side wall, for containing said second liquid and from which said first liquid is to be removed, and wherein said apparatus is disposed in said upright position in said tank with said liquid trap chamber disposed at a lower depth than the remainder of the apparatus.

13. The apparatus according to claim 12, wherein said outlet passage extends to above the surface of liquid in said tank.

14. The apparatus according to claim 12, wherein said tank further includes a top wall.

15. The apparatus according to claim 13, wherein said liquid trap chamber is disposed at the bottom of said tank, the ingress opening of the inlet passage being spaced above the bottom of said tank, and said outlet passage extending upwardly beyond said top wall.

16. The apparatus according to claim 15, wherein said first liquid is water and said second liquid is hydrocarbon fuel.

17. The apparatus according to claim 16, wherein said fuel is diesel fuel.

18. The apparatus according to claim 15, wherein said outlet passage is a first relatively long vertically-extending tube having an open outlet end remote from said liquid trap chamber, wherein said inlet passage comprises a second relatively short vertically-extending tube.

19. The apparatus according to claim 18, wherein said inlet passage and said liquid trap chamber are formed as a S-shaped tube having one end in flow communication with said ingress opening and a second end in flow communication with said outlet passage.

20. The apparatus according to claim 12, wherein said lowermost section of said top chamber wall is at a level below said bottom end of the primer wick means.

21. The apparatus according to claims 1, 2 or 3 wherein said lowermost section of said top chamber wall is at a level below said bottom end of said primer wick means.

22. The apparatus according to claims 1, 2 or 3 wherein the top end of said primer wick means is at a level slighty below said weir means and above the lowermost section of said top chamber wall.

23. A method for separating a first liquid of known specific gravity from a second liquid of lesser specific gravity in a tank wherein the second liquid is supported by surface tension in a column above said first liquid, said method comprising the steps of:
drawing liquid from the bottom of said tank upward through an inlet passage with a primer wick;
flowing liquid from said inlet passage over a weir and into a liquid trap chamber;
drawing liquid above a predetermined height in said liquid trap chamber out of said tank; and
establishing a liquid dam of said first liquid in said liquid trap chamber to block flow communication between said inlet passage and said predetermined height when the level of said first liquid in said tank falls to a predetermined level.

24. The method according to claim 23, wherein, in said step of establishing, said predetermined level is the bottom of said primer wick.

* * * * *